United States Patent [19]
Frank

[11] Patent Number: 5,457,767
[45] Date of Patent: Oct. 10, 1995

[54] WATER TANK FOR HEATING WATER WITH OBLIQUE PARTITION FORMING SEPARATE LIME-PRECIPITATING AND HEATING SECTIONS

[75] Inventor: John Frank, Odense, Denmark

[73] Assignee: Wittenborg A/S, Odense, Denmark

[21] Appl. No.: 295,630

[22] PCT Filed: Mar. 2, 1993

[86] PCT No.: PCT/DK93/00073

§ 371 Date: Aug. 29, 1994

§ 102(e) Date: Aug. 29, 1994

[87] PCT Pub. No.: WO93/18338

PCT Pub. Date: Sep. 16, 1993

[30] Foreign Application Priority Data

Mar. 5, 1992 [DK] Denmark .................. 0302/92

[51] Int. Cl.[6] ................ A47J 31/54; F22B 1/28
[52] U.S. Cl. ........................ 392/452; 392/449
[58] Field of Search ............... 392/449–454, 392/441, 445; 122/4 A, 13.2

[56] References Cited

U.S. PATENT DOCUMENTS

| 3,291,965 | 12/1966 | Hatch | 392/450 |
| 3,381,111 | 4/1968 | Popyk | 392/452 |

FOREIGN PATENT DOCUMENTS

| 143619 | 6/1985 | European Pat. Off. | |
| 2461709 | 7/1975 | Germany | 392/452 |
| 61-197953 | 9/1986 | Japan | |
| 61-265447 | 11/1986 | Japan | 392/452 |
| 304552 | 1/1929 | United Kingdom | 392/452 |

Primary Examiner—John A. Jeffery
Attorney, Agent, or Firm—Ladas & Parry

[57] ABSTRACT

A water tank for heating water preferably in a vending machine for beverages comprises a feed-water inlet (2), a hot water outlet (3), as well as a heating member (4) for heating the water. The water tank (1) is divided into a heating section (21) including the hot water outlet (3) and the heating member (4), as well as a lime-precipitating section (22) including the feed-water inlet (2), said tank being divided by means of a partition (6). This partition (6) extends from one side (7) of the water tank immediately adjacent the surface of the water at maximum water level (10) and obliquely downwards towards the opposite side (12) of said water tank. Then the partition extends at a distance from the tank wall (12) downwards to the immediate vicinity of the bottom (14) of said water tank, whereby the heating section (21) is placed below the oblique portion (11) of the partition (6). An upper flow passage (18, 19) for water is provided between the heating section (21) and the lime-precipitating section (22) at the upper end of the oblique portion (11) of the partition (6), and a lower flow passage (28) for water is provided between the lime-precipitating section (22) and the heating section (21) at the lower rim of the partition (6).

7 Claims, 3 Drawing Sheets

WATER TANK FOR HEATING WATER WITH OBLIQUE PARTITION FORMING SEPARATE LIME-PRECIPITATING AND HEATING SECTIONS

TECHNICAL FIELD

The invention relates to a water tank for heating water preferably in a vending machine for beverages, said tank comprising a feed-water inlet, a hot water outlet, as well as a heating member for heating the water.

BACKGROUND ART

The hot water tank in vending machines for beverages was previously made of metal or metal parts with the effect that the lime in the water deposited as flakes on the metal surfaces, whereby a decalcification for 2 to 3 hours was necessary 2 to 5 times annually. A manufacture of hot water tanks of plastics eliminates the frequent decalcification, but is instead encumbered with the problem of lime particles floating in the water and following said water when the hot water leaves the hot water tank, said plastics for instance being polypropylene which is particularly resistant to lime deposits on the surfaces. The lime particles are formed by lime crystals, which in turn result from the process

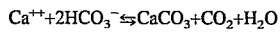

$$Ca^{++}+2HCO_3^- \rightleftharpoons CaCO_3+CO_2+H_2O$$

The lime crystals deposit as small particles in the water instead of on the inner side of the water tank. These small particles act as germs to larger lime crystals, which at first float in the water, and later on settle. The $CaCO_3$-crystals are of a larger density than water and do not settle immediately because the resulting $CO_2$ deposits on the crystals and thereby keeps said crystals floating until they have reached a predetermined size.

When the water tank is used, a considerable amount of lime crystals is constantly floating in the water. These crystals can both act on the delivery functions inter alia by settling in the closing mechanisms of the valves, and cause inconvenience to the customer as the water delivered, such as a beverage, will contain visible lime crystals.

DESCRIPTION OF THE INVENTION

The object of the present invention is to provide a water tank ensuring such a precipitation of lime that the delivered hot water is substantially free of lime particles.

The water tank according to the invention is characterised in that the water tank is divided into a heating section including the hot water outlet and the heating member, as well as a lime-precipitating section including the feed-water inlet, said tank being divided by means of a partition extending from one side of the water tank immediately adjacent the surface of the water at maximum water level and obliquely downwards towards the opposite side of said water tank and then further at a distance from the tank wall downwards to the immediate vicinity of the bottom of said water tank, whereby the heating section is placed below the oblique portion of the partition, that an upper flow passage for water is provided between the heating section and the lime-precipitating section at the upper end of the oblique portion of the partition, and that a lower flow passage for water is provided between the lime-precipitating section and the heating section at the lower rim of the partition.

In this manner a water tank is provided which ensures removal of all the lime particles from the water to be dispensed. This advantage is obtained by the partition with flow passages at the top and at the bottom acting as a guiding screen, which ensures that a controlled circulation is obtained. The controlled circulation is initiated as soon as the heating member is turned on, especially each time fresh feeding water is supplied to the water tank through the feed-water inlet. The heated water rises from the heating member and initiates a circulation conveying newly formed lime crystals to the opposite side of the partition and into the lime-precipitation section through the upper flow passage. As the partition extends obliquely downwards from one side of the water tank to the opposite side, only a rather small surface area is left above the heating member with the result that all the lime particles following the upward movement during the circulation are immediately carried directly upwards through the upper flow passage and into the lime-precipitation section. In the lime-precipitating section, the lime particles have time to grow until they are capable of settling, which occurs by said particles following the water circulation downwards between the partition and the tank wall to the bottom of the water tank. Once settled on the bottom of the water tank, the lime particles are easily removed by way of flushing out through an outlet in the bottom of the water tank.

When fresh water is supplied during or after the feeding of the hot water, the fresh water liberates a particularly high amount of lime and delivers most of said lime to the lime-precipitation section at the same time as a circulation is initiated by the fresh cold water moving downwards in the lime-precipitation section. When the fresh, not completely heated water circulates in the water tank, it causes a thermostat to activate the heating member with the result that the circulation continues and thereby carries the just formed lime crystals of the fresh water from the heating section to the lime-precipitating section. In this manner the water tank is divided into a substantially lime-free zone and a lime-containing zone, said lime-containing zone being placed in the lime-precipitating section. A suitable shaping of the channel formed by the partition and the tank wall renders it possible to obtain such a flow speed during the water circulation that the lime particles moving downwards are not whirled about but settle calmly on the bottom, from where they are removed at regular intervals. As a result it is now possible to avoid the traditional decalcification with acid followed by a washing before the water tank can be used for drinking water. The drawbacks of the floating lime particles have been eliminated as water is only tapped from the lime-free zone.

During the delivery of water, the water level drops at least initially inside the water tank. When the water level is low, the upper portion of the partition acts as a brake to the lime-containing particles with the result that a circulation of lime-containing water is not initiated in the wrong direction. Shortly after the water level has dropped during the delivery of hot water, the supply of cold water is started and causes a circulation in the correct direction.

According to the invention, the lower rim of the upper flow passage may be placed a short distance below the water surface at maximum water level, but at the lowest level of the water surface immediately after initiation of the feeding of water. In this manner the described braking effect against a circulation in the wrong direction is particularly efficient.

According to the invention, the upper flow passage is particularly advantageously formed by at least two mutually spaced recesses provided in the partition, whereby a particularly fast water flow is ensured through the upper flow passage formed by the two recesses at the same time as said recesses are suitably formed so as to allow passage of the connecting members of the heating member.

According to the invention the lower flow passage may be defined by a partition portion extending parallel to the bottom of the tank towards the heating section with the result that the circulating water has a reduced tendency to whirl up the deposited lime particles from the bottom. In addition, advantageous means for fixing the partition relative to the bottom of the container is provided.

According to the invention it is particularly advantageous when the partition is shaped integral with an upward web, which above the water surface abuts the tank wall and rests against a cover on the water tank. In this manner a simple way of correctly positioning the partition and consequently especially the upper flow passages relative to the water surface is obtained.

By an embodiment of the water tank according to the invention, where the maximum level is detected by means of an electrode projecting downwards so as to establish an electric connection when the water surface is at maximum level, said water tank is characterised in that the end of the electrode facing the water is conically shaped with half a vertex angle exceeding the rim angle of the water with a vertical electrode wall. As a result, the water forms an efficient contact with the electrode despite the lime particles present on the water surface.

Finally according to the invention, the electrode may advantageously be sleeve-shaped and coaxially surround the hose when the feed-water inlet comprises a hose extending from above and downwards into the water in the water tank.

BRIEF DESCRIPTION OF THE DRAWINGS

The invention is described in greater detail below with reference to the accompanying drawings, in which.

BEST MODE FOR CARRYING OUT THE INVENTION

Figure 1:
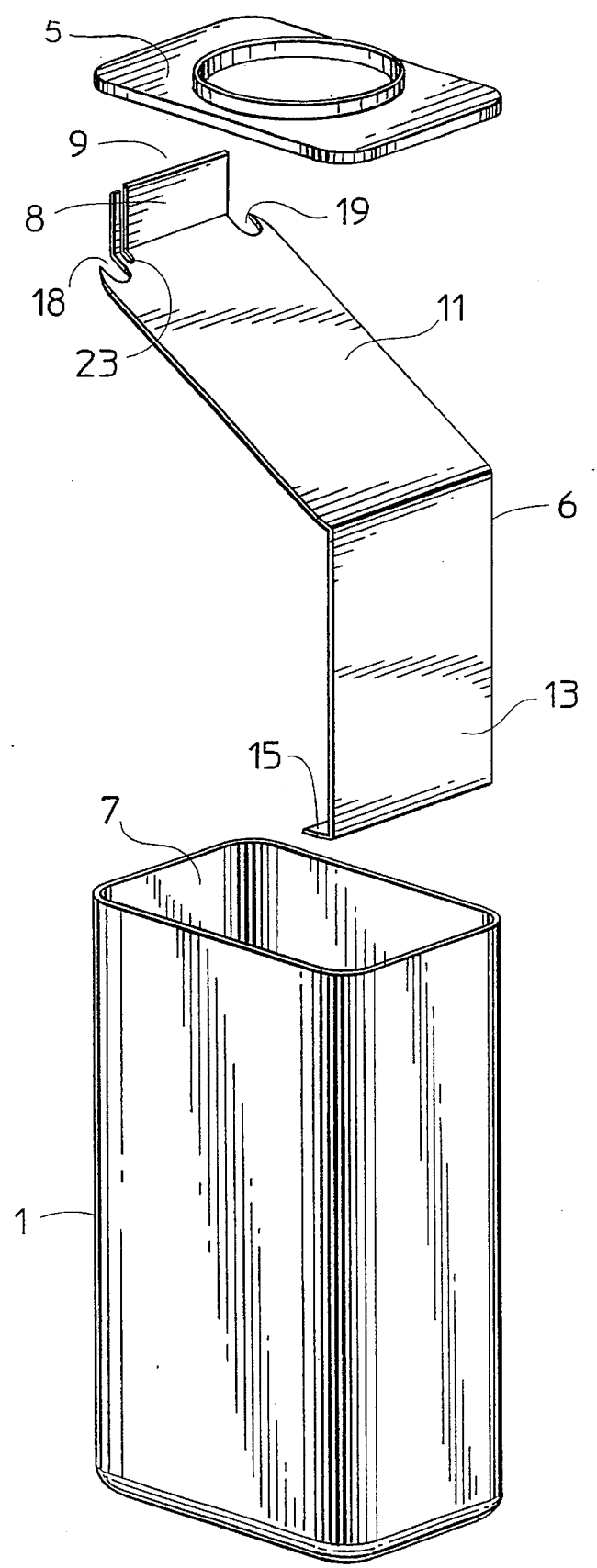
FIG. 1 is a perspective view of a preferred embodiment of a water tank according to the invention, where the parts have been separated for the sake of clarity.
Figure 2:
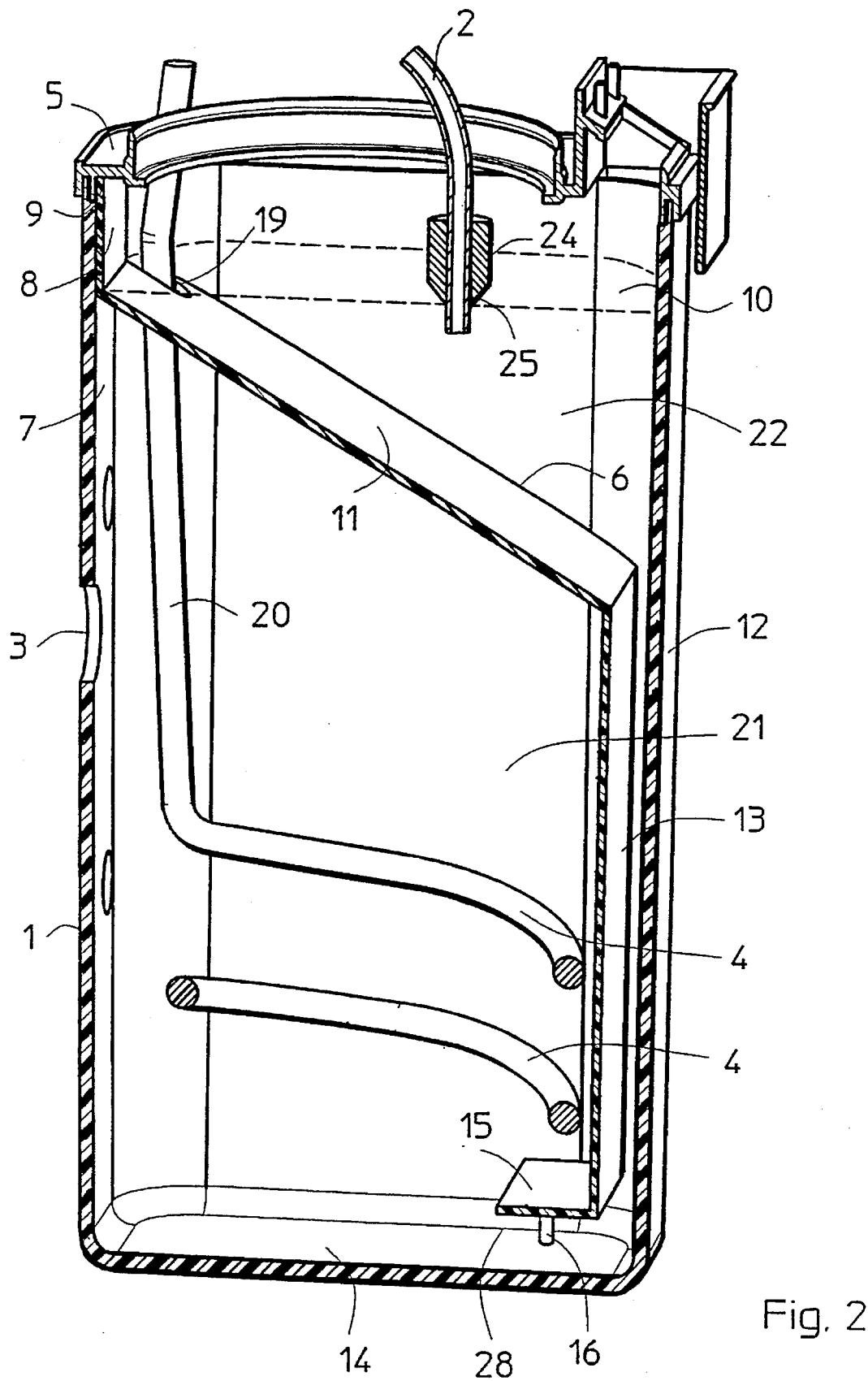
FIG. 2 is a vertical sectional view of the water tank of FIG. 1, where the individual parts are correctly positioned.

The water tank of FIGS. 1 and 2 is designated the general reference numeral 1 and is of a conventionally known type with a feed-water inlet 2, a hot-water outlet 3 only indicated as an opening in the tank wall, as well as a heating member 4. At the top, the water tank 1 comprises a cover 5.

A partition is placed inside the water tank 1, said partition being designated the general reference numeral 6. This partition is shaped with a web 8 vertically abutting one tank wall 7 and adapted to abut the tank cover 5 by an upper rim 9. The partition 6 continues from a level immediately above a maximum water level 10 into an inclining, plane portion 11 which extends obliquely downwards with an inclination of preferably about 30°. The inclining, plane portion 11 of the partition 6 continues a short distance from the tank wall 12 opposing the tank wall 7 into a vertically extending plane portion 13 extending parallel to the tank wall 12 downwards to the immediate vicinity above the bottom 14 of the water tank. Here the partition 6 continues into a horizontally extending partition portion 15, which in turn extends a short distance away from the adjacent tank wall 12 parallel to the tank bottom 14. The partition rests on pins 16, only one pin appearing from FIG. 2. These pins project from the tank bottom 14 and abut the horizontal partition portion 15. Thus the partition 6 is fixed in vertical direction between the pins 16 and the cover 5. The side rims of the partition are shaped to closely follow the walls of the water tank 1 by a press-fitting as they present an outline corresponding to the cross-sectional shape of the water tank 1. As illustrated in particular in FIG. 1, the water tank is of a substantially rectangular shape with rounded corners. As the side rims are adapted thereto, the partition 11 is also fixed in horizontal direction, the vertically extending plane portion 13 of the partition abutting curved corners in the water tank 1.

As illustrated in FIG. 1, each side of the web 8 is provided with recesses 18, 19 extending a distance downwards into the oblique portion 11 of the partition. The portion of the recesses 18 and 19 placed in the oblique portion 11 of the partition 6 is placed substantially below the maximum water level 10 inside the water tank with the result that it forms flow passages from the portion of the water tank below the oblique portion 11 of the partition 6 to the portion thereof placed above said oblique portion. The recesses 18 and 19 are shaped in such a size that they also form passages for the connecting members 20 of the heating member 4. FIG. 2 only illustrates one connecting member 20. The heating member 4 is thus placed below the oblique portion 11 of the partition 6. Accordingly, this portion of the water tank forms a heating section 21 whereas the portion of the water tank placed on the opposite side of the partition 6 forms a lime-precipitating section 22. As illustrated in FIG. 1, a third recess 23 is provided in the top of the partition 6, said recess 23 serving to allow passage of a dry-boiling protection means (not shown) of a conventional type.

Figure 3:
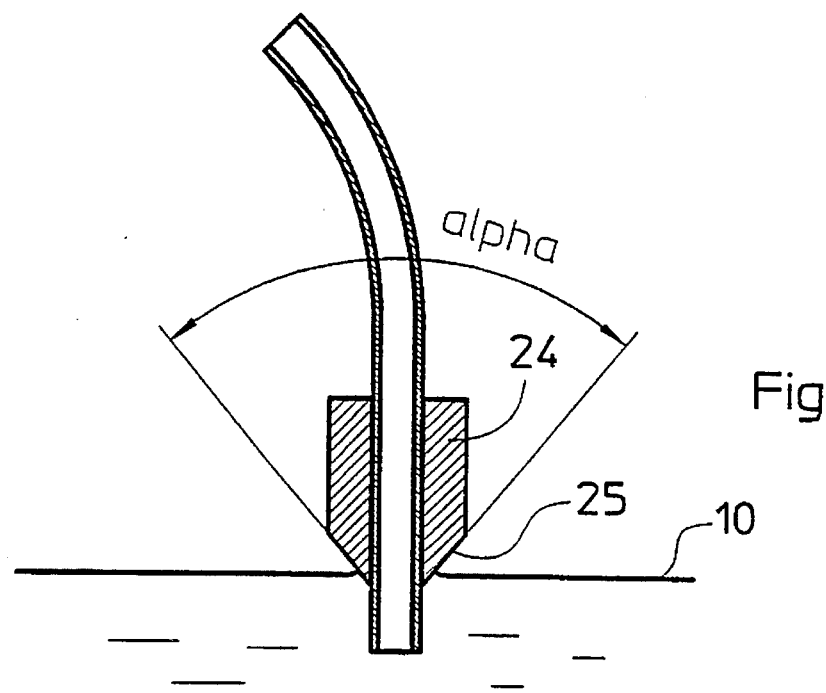
FIG. 3 is a diagrammatic, vertical sectional view of a preferred embodiment of an electrode shaped in connection with a water inlet hose.
Figure 4:
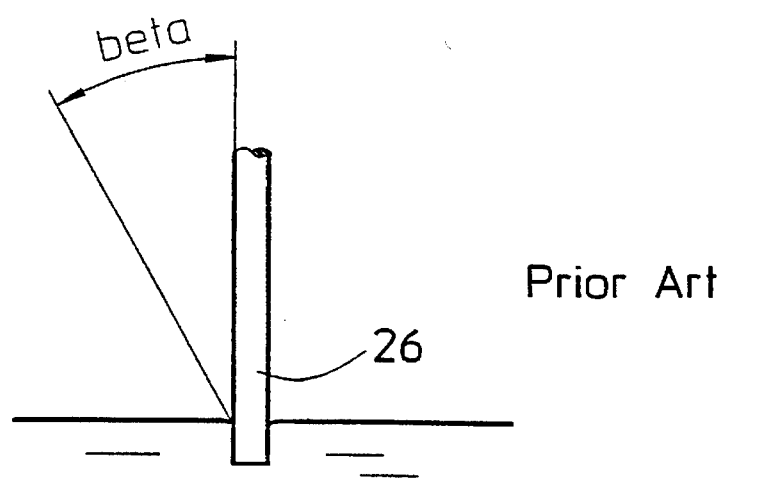
FIG. 4 illustrates a conventional electrode with parallel sides.

The water inlet 2 is formed by a water-inlet hose, cf. FIG. 2, discharging below the maximum water level 10. A sleeve-shaped electrode 24 is coaxially arranged about the water-inlet hose 2, said electrode detecting the maximum water level 10. This electrode enters into an electric connection with the heating member 4 at maximum water level and thereby interrupts the water supply through the water-inlet hose 2. The latter procedure is performed in a conventionally known manner by means of control devices and control valves not shown. When the electric connection is interrupted between the heating member 4 and the electrode 24 due to water being delivered from the water tank through the water outlet 3, the water inlet is opened and water continues to enter the water tank until the water level has again reached the maximum water level 10 and the electric connection has been reestablished. As illustrated in FIG. 2 and on a larger scale in FIG. 3, the electrode 24 is shaped with a downwardly conical end 25 facing the water surface, said end being shaped with a vertex angle a of preferably about 70°. The vertex angle is dimensioned on the basis of the rim angle β, cf. FIG. 4, between an electrode 26 of a conventionally known type and a water surface. In order to ensure an efficient electric connection between the electrode 24 and the water inside the water tank 1 despite the presence of lime particles, the conical end 25 is shaped with a vertex angle α exceeding twice the rim angle β. In this manner it is ensured that the water almost climbs up the conical end of the electrode and forms a particularly good contact therewith.

When the water tank according to the invention is used, the presence of the partition 6 provides a circulation of water from the heating section 21 to the lime-precipitating section 22, whereby the lime particles floating in the heating section 21 are forced to follow the movement into the lime-precipitating section and therein have time to grow to such a size that they sink together with the water flowing between the vertically extending portion 13 of the partition 6 and the tank wall 12 so as finally to settle on the tank bottom 14 while the water flows back to the heating section through the lower flow passage 28 between the partition 6 and the bottom 14. This circulation is initiated when the heating member 4 is activated under the control of suitable thermostats. The heating member 4 is in particular activated when fresh water is supplied to the water tank through the water-inlet hose 2 at a signal from the sensor 24 when water is delivered from the heating section. An injector effect arises during the supply of water at the water-inlet hose 2 in the middle of the electrode 24. This injector effect causes lime particles to be carried away from the electrode and into the water, whereby an additional security is obtained that a good electric contact can be established between the water and the electrode when the water level again reaches the maximum level 10. The recesses 18 and 19 are shaped in such a manner that their lower rims are placed almost on a level with the lowest water level in connection with an ordinary use of the water tank. In addition, they must be of such a size that they ensure a fast flowing in of water from the heating section 21 to the lime-precipitating section 22. By a preferred embodiment of the invention, the latter is obtained by a flow area of about 2 cm$^2$ being provided around the connecting members 20 of the heating member 4.

According to a preferred embodiment of the invention, the distance between the vertically extending portion 13 of the partition 6 and the tank wall 12 is 10 mm, whereby a tank with a horizontal cross-sectional area of 115 times 150 mm presents a flow area of about 10 cm$^2$. The distance between the bottom 14 and the horizontal partition portion 15 is about 18 mm. The tank is preferably of a capacity of 3.8 l. When the tank is used, the water level drops about 5 mm before the supply of water is initiated, and then the water level rises slowly again until the delivery of water is terminated and the supply of water is interrupted. The partition is integrally shaped and made of plastics and preferably the same plastics, viz. polypropylene, as the water tank 1.

The invention has been described with reference to a preferred embodiment. Many modifications may be carried out without thereby deviating from the scope of the invention. Thus the upper flow passage formed by the two recesses 18 and 19 may instead be shaped as a horizontal slot.

I claim:

1. A water tank for heating water preferably in a vending machine for beverages, said tank comprising a feed-water inlet, a hot water outlet, as well as a heating member for heating the water, characterised in that the water tank (1) is divided into a heating section (21) including the hot water outlet (3) and the heating member (4), as well as a lime-precipitating section (22) including the feed-water inlet (2), said tank being divided by means of a partition (6) extending from one side (7) of the water tank immediately adjacent the surface of the water at maximum water level (10) and obliquely downwards towards the opposite side (12) of said water tank and then further at a distance from the tank wall (12) downwards to the immediate vicinity of the bottom (14) of said water tank, whereby the heating section (21) is placed below the oblique portion (11) of the partition (6), that an upper flow passage (18, 19) for water is provided between the heating section (21) and the lime-precipitating section (22) at the upper end of the oblique portion (11) of the partition (6), and that a lower flow passage (28) for water is provided between the lime-precipitating section (22) and the heating section (21) at the lower rim of the partition (6).

2. A water tank as claimed in claim 1, characterised in that the lower rim of the upper flow passage is placed a short distance below the water surface at maximum water level (10), but at the lowest level of the water surface immediately after initiation of the feeding of water.

3. A water tank as claimed in claim 1, characterised in that the upper flow passage (18, 19) is formed by at least two mutually spaced recesses (18, 19) provided in the partition (6).

4. A water tank as claimed in claim 1, characterised in that the lower flow passage (28) is defined by a partition portion (15) extending parallel to the bottom (14) of the tank towards the heating section (21).

5. A water tank as claimed in claim 1, characterised in that the partition (6) is formed integral with an upward web (8), which above the water surface abuts the tank wall (7) and rests against a cover (5) on the water tank.

6. A water tank as claimed in claim 1, and where the maximum water level is detected by means of an electrode projecting downwards so as to establish an electric connection when the water surface is at maximum level, characterised in that the end (25) of the electrode facing the water is conically shaped with half a vertex angle exceeding the rim angle ($\beta$) of the water with a vertical electrode wall.

7. A water tank as claimed in claim 6, and where the feed-water outlet comprises a hose extending from above and downwards into the water in the water tank, characterised in that the electrode (24) is sleeve-shaped and coaxially surrounds the hose (2).

* * * * *